(12) United States Patent
Makino et al.

(10) Patent No.: US 10,015,332 B2
(45) Date of Patent: Jul. 3, 2018

(54) IMAGE PROCESSING APPARATUS GENERATING A PORTION OF A PAGE INCLUDING A HEADING AS A REDUCED IMAGE OF THE PAGE, AND IMAGE PROCESSING METHOD, AND NON-TRANSITORY COMPUTER READABLE MEDIUM THEREOF

(71) Applicant: FUJI XEROX CO., LTD., Tokyo (JP)

(72) Inventors: Yohei Makino, Kanagawa (JP); Satoshi Maruyama, Kanagawa (JP); Yutaka Koda, Kanagawa (JP); Tetsuya Hommi, Kanagawa (JP); Yasushi Ujigawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/445,181

(22) Filed: Feb. 28, 2017

(65) Prior Publication Data

US 2018/0054533 A1    Feb. 22, 2018

(30) Foreign Application Priority Data

Aug. 19, 2016    (JP) .................................. 2016-161374

(51) Int. Cl.
 *G06F 15/00* (2006.01)
 *G06K 1/00* (2006.01)
 *H04N 1/00* (2006.01)

(52) U.S. Cl.
 CPC ....... *H04N 1/00469* (2013.01); *H04N 1/0044* (2013.01); *H04N 1/00411* (2013.01); *H04N 1/00461* (2013.01); *H04N 2201/0081* (2013.01); *H04N 2201/0082* (2013.01)

(58) Field of Classification Search
 CPC .......... H04N 1/00469; H04N 1/00411; H04N 1/0044; H04N 1/00461; H04N 2201/0081; H04N 2201/0082
 USPC .................................... 358/1.6, 1.7, 1.8, 1.1
 See application file for complete search history.

(56) References Cited

U.S. PATENT DOCUMENTS

| 2010/0220929 A1* | 9/2010 | Misawa | ............ G06F 17/30253 382/190 |
| 2016/0147386 A1* | 5/2016 | Han | .................... H04N 1/00411 715/838 |

FOREIGN PATENT DOCUMENTS

| JP | 2008-298903 A | 12/2008 |
| JP | 2009-044283 A | 2/2009 |

\* cited by examiner

*Primary Examiner* — Douglas Tran
(74) *Attorney, Agent, or Firm* — Oliff PLC (57) ABSTRACT

Provided is an image processing apparatus including a memory that stores information, and a reduced image generation unit that extracts a row including a distinguishable part from other rows as a heading from a vertically long range from top to bottom on a left end side when document data is horizontally written, extracts a row including a distinguishable part from other rows as a heading from a horizontally long range from a right end to a left end on an upper end side when the document data is vertically written, and generates a portion including the heading as a reduced image.

10 Claims, 8 Drawing Sheets

IMAGE PROCESSING APPARATUS GENERATING A PORTION OF A PAGE INCLUDING A HEADING AS A REDUCED IMAGE OF THE PAGE, AND IMAGE PROCESSING METHOD, AND NON-TRANSITORY COMPUTER READABLE MEDIUM THEREOF

CROSS-REFERENCE TO RELATED APPLICATIONS

This application is based on and claims priority under 35 USC 119 from Japanese Patent Application No. 2016-161374 filed Aug. 19, 2016.

BACKGROUND

Technical Field

The present invention relates to an image processing apparatus, an image processing method, and a non-transitory computer readable medium.

SUMMARY

According to an aspect of the invention, there is provided an image processing apparatus including:

a memory that stores information; and a reduced image generation unit that extracts a row including a distinguishable part from other rows as a heading from a vertically long range from top to bottom on a left end side when document data is horizontally written, extracts a row including a distinguishable part from other rows as a heading from a horizontally long range from a right end to a left end on an upper end side when the document data is vertically written, and generates a portion including the heading as a reduced image.

BRIEF DESCRIPTION OF THE DRAWINGS

Exemplary embodiments of the present invention will be described in detail based on the following figures, wherein.

DETAILED DESCRIPTION

Figure 1:
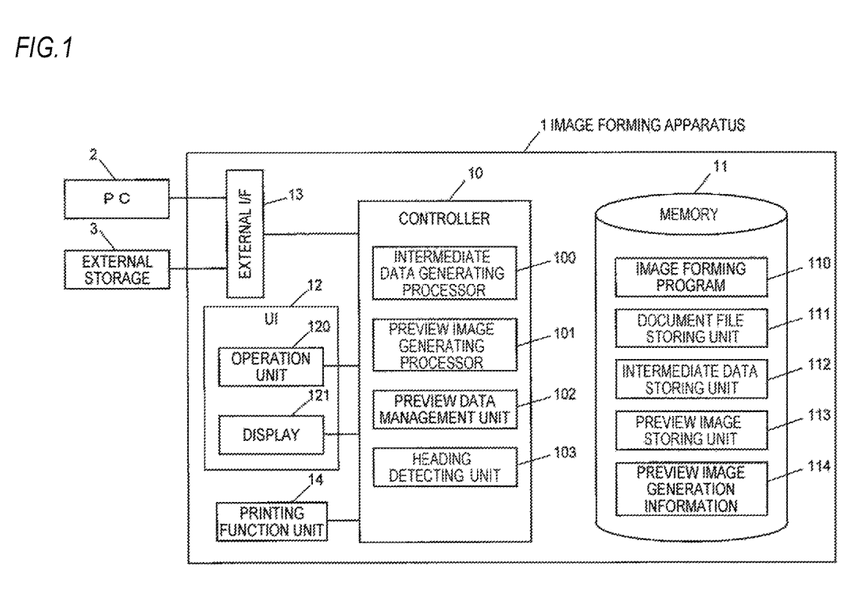
FIG. 1 is a block diagram schematically illustrating an image forming apparatus according to an exemplary embodiment of the present invention.

FIG. 1 is a block diagram schematically illustrating an image forming apparatus as an example of an image processing apparatus according to an exemplary embodiment of the present invention.

As illustrated in FIG. 1, an image forming apparatus 1 includes a controller 10, a memory 11, a user interface (UI) 12, an external interface (external I/F) 13, a printing function unit 14, and the like. The controller 10 is composed of a CPU or the like, controls other various units and executes various programs. The memory 11 is composed of a recording medium such as a hard disk, a flash memory or the like, and stores information. The UI 12 includes a touch panel and is an operation/display unit including an operation unit 120 and a display 121. In addition, a personal computer (PC) 2 as an external terminal device and an external storage 3 are connected to the image forming apparatus 1 via the external I/F 13.

The image forming apparatus 1 according to the present exemplary embodiment includes the printing function unit 14 as described above, and prints a document file received from the external terminal device such as the personal computer 2 or the external I/F 13 or a document file stored in the memory 11 of the image forming apparatus 1 based on an instruction from a user.

When printing some of plural pages of a document file, the user displays each of the pages of the document file, as a reduced image (hereinafter referred to as a "preview image"), on the display 121 of the image forming apparatus 1. The user selects a page to be printed while seeing a preview image of each page displayed on the display 121. Then, when the user issues a print instruction, printing is started.

The present exemplary embodiment involves generating and displaying a portion including a heading in each page of a document file, as a preview image, from document data of the page, so that a page to be printed may be easily checked by a user.

The controller 10 of the image forming apparatus 1 functions as an intermediate data generating processor 100, a preview image generating processor 101, a preview data management unit 102, a heading detecting unit 103 and the like by executing an image forming program 110 as one example of an image processing program stored in the memory 11 to be described later. The preview image generating processor 101 is one example of a reduced image generation unit that generates a reduced image.

The intermediate data generating processor 100 generates intermediate data for drawing from document data of each page of the document file.

The preview image generating processor 101 generates a preview image from the intermediate data of each page by reducing a portion including a heading in one page to a predetermined size. The preview image generating processor 101 generates the preview image based on information of a heading detected by the heading detecting unit 103. The generated preview image is displayed on the display 121. That is, when the document data is written horizontally, the preview image generating processor 101 extracts a row including a distinguishable part from other rows, as a heading, from a vertically long range from the top to the bottom at the left end side, and generates a portion including the heading, as a preview image. When the document data is written vertically, the preview image generating processor 101 extracts a row including a distinguishable part from other rows, as a heading, from a horizontally long range from the right end to the left end at the upper end side, and generates a portion including the heading, as a preview image.

The preview data management unit 102 stores the generated preview image in the memory 11 or displays the preview image on the display 121 to manage the preview image.

The heading detecting unit 103 detects the heading from one page of the document file. How to detect the heading will be described in detail later.

The memory 11 of the image forming apparatus 1 stores an image forming program 110, a document file storing unit 111, an intermediate data storing unit 112, a preview image storing unit 113, preview image generation information 114 and the like.

The document file storing unit 111 stores a document file received in the image forming apparatus 1. The document file is stored in the memory 11 of the image forming apparatus 1, but may be taken from a PC 2 or may be loaded from files stored in the external storage 3 such as a USB. Alternatively, when the image forming apparatus 1 has a scanner function, the document file may be read by a scanner and stored in the memory 11.

The intermediate data storing unit 112 stores intermediate data generated from the document data of each page of the document file. The preview image storing unit 113 stores a preview image generated from the intermediate data. The preview image generation information 114 stores various kinds of information used when the preview image generating processor 101 generates a preview image, such as information on the heading detected by the heading detecting unit 103.

Figure 2:
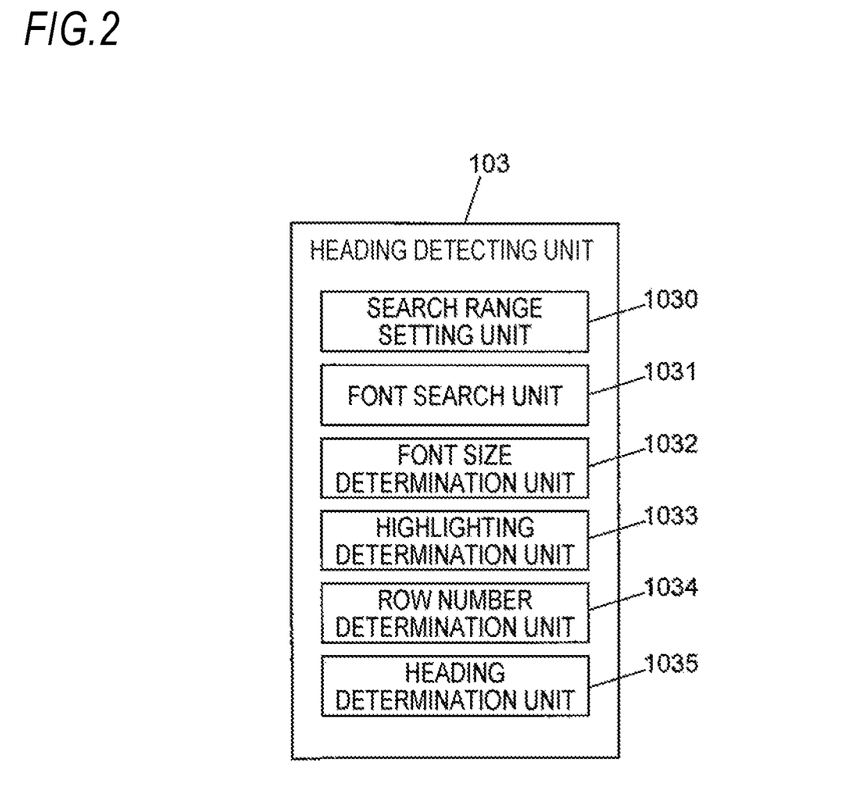
FIG. 2 is a block diagram illustrating a schematic configuration of a heading detecting unit.

FIG. 2 is a block diagram illustrating a schematic configuration of the heading detecting unit 103. As illustrated in FIG. 2, the heading detecting unit 103 includes a search range setting unit 1030, a font search unit 1031, a font size determination unit 1032, a highlighting determination unit 1033, a row number determination unit 1034 and a heading determination unit 1035.

The search range setting unit 1030 sets a range for searching for the heading in one page of the document file. The font search unit 1031 searches for character data in the set search range. The font size determination unit 1032 compares font sizes and font thicknesses with respect to the character data searched within the search range.

The highlighting determination unit 1033 determines an element that highlights character data other than the font sizes and thicknesses for the character data searched within the search range. The row number determination unit 1034 determines the number of rows of a candidate for the heading. The heading determination unit 1035 determines the heading from the determination results of the above described units.

Figure 3A:
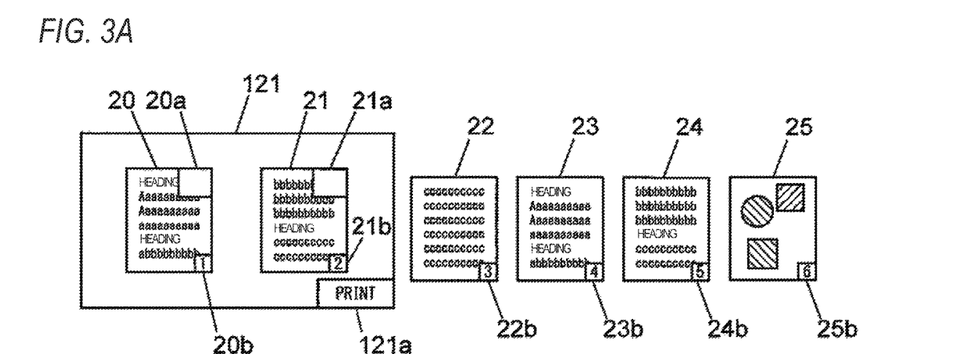
FIGS. 3A and 3B are explanatory views illustrating examples of a display of a preview image in the present invention, FIG. 3A illustrating a normal preview display and FIG. 3B illustrating a preview display of a heading according to the present invention.
Figure 3B:
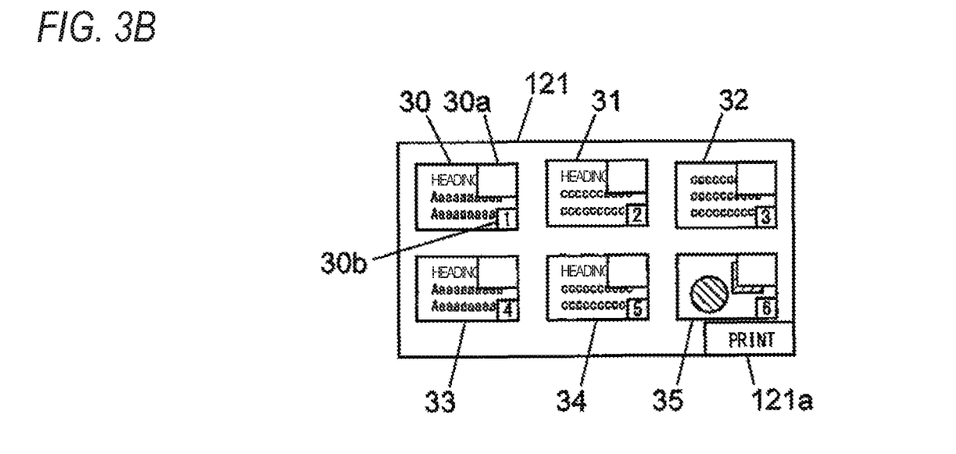

FIGS. 3A and 3B are explanatory views illustrating examples of a display of a preview image in the present exemplary embodiment, FIG. 3A illustrating a normal preview display and FIG. 3B illustrating a preview display of a heading according to the exemplary embodiment.

It is now assumed that a document file includes document data of, for example, 6 pages. Typically, a preview image of the whole of one page is displayed. Then, since a display screen of the display 121 is smaller than a display screen of the PC 2, for example, preview images of only two pages, that is, a preview image 20 of the first page and a preview image 21 of the second page, are displayed on the display 121 as illustrated in FIG. 3A.

Page selection buttons 20*a* and 21*a* in square are displayed in the right upper portions of the preview images 20 and 21, respectively, displayed on the display 121. A user selects a page to be printed by checking these selection buttons 20*a* and 21*a*.

Page fields 20*b* and 21*b* indicating the number of pages are displayed in the right lower portions of the preview images 20 and 21, respectively. Likewise, page fields 22*b*, 23*b*, 24*b* and 25*b* indicating the number of pages are provided in the right lower portions of preview images 22 to 25, respectively, from the third page to the sixth page.

After the user selects a page to be printed by checking the selection buttons 20*a*, . . . of the preview images 20, . . . , printing of the selected page is performed when a PRINT button 121*a* provided in the right lower portion of the display 121 is pressed.

In this way, in the normal preview display, since the number of preview images displayed on the display 121 at a time is limited, in order to display the preview images 22 to 25 from the third page to the sixth page, it is necessary for the user to switch the screen by flicking the display 121.

Therefore, in the present exemplary embodiment, as illustrated in FIG. 3B, preview images 30 to 35 each of which has only a portion including a heading of each page are displayed on the display 121. As a result, it is possible to display many preview images on a display area of the display 121.

In the preview image 30 of a portion of a page including the heading, a selection button 30*a* for selecting a page is displayed in the right upper portion and a field 30*b* indicating the number of pages is provided in the right lower portion. The same applies to other preview images 31, . . . .

When the user checks the selection button of the page to be printed and presses the PRINT button 121*a* at the right lower portion of the display 121, the whole of the selected page is printed.

In addition, in the present exemplary embodiment, since a preview image is partially created for one page, when the user wishes to confirm the entire range of the page and touches a portion other than the selection button of the preview image, the whole of the touched page is displayed as a preview in detail.

(Operation of Exemplary Embodiment)

Figure 4:
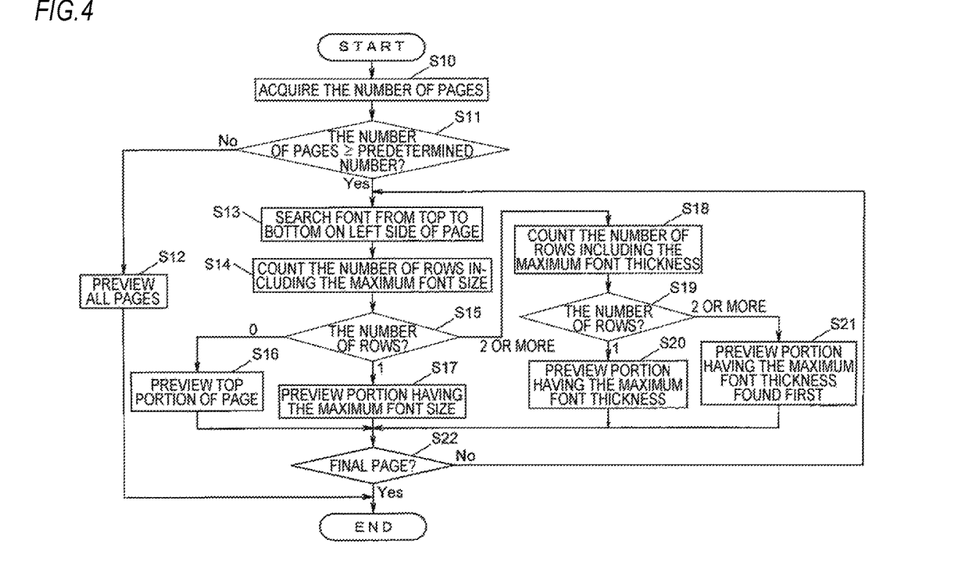
FIG. 4 is a flowchart illustrating an example of the operation of the exemplary embodiment of the present invention.

FIG. 4 is a flowchart illustrating an example of the operation of the exemplary embodiment of the present invention. Hereinafter, an example of the operation of the present exemplary embodiment will be described with reference to the flowchart in FIG. 4. In the following description, it is assumed that characters of a document file to be printed by a user are horizontally written.

When a user prints some pages of a certain document file, the document file is first read by the controller 10 of the image forming apparatus 1 and the number of pages of the document file is acquired (S10).

Next, it is determined whether or not the number of pages of the document file is equal to or greater than a predetermined number (S11). This predetermined number is set as the number of preview images of all pages that may be displayed on the display 121. For example, in FIG. 3A, two preview images 20 and 21 may be displayed on the display 121 and the predetermined number in the example in FIG. 3A is 3.

This predetermined number is set as the preview image generation information 114 determined in advance according to the size of the display area of the display 121, a reduction ratio at the time of preparing a preview image, or the like.

When it is determined that the number of pages of the document file is smaller than the predetermined number (No in S11), since normal preview display is possible on the display 121, a normal preview image is created for all pages of the document file and is displayed on the display 121 (S12).

When it is determined that the number of pages of the document file is equal to or larger than the predetermined number (Yes in S11), a range for searching for a heading in one page of the document file is set and character data is searched within the set search range (S13).

Specifically, since it is assumed that the current document file is written horizontally, the search range setting unit 1030 sets a range from the top to the bottom of a page on the left side of the page, as the search range, and the font search unit 1031 searches for fonts within the set search range.

Although the search range is set in advance by the search range setting unit 1030, a user may also use the operation unit 120 to instruct the search range setting unit 1030 to set the search range each time depending on the document file. In addition, even when the search range setting unit 1030 sets the search range in advance, the search range setting unit 1030 may set several patterns and the user may select and use them.

The font search unit 1031 searches for fonts from the top to the bottom of the page in the search range. When a font is found, the font search unit 1031 stores the font size and thickness of the found font and the position of the font in the page.

Figure 5:
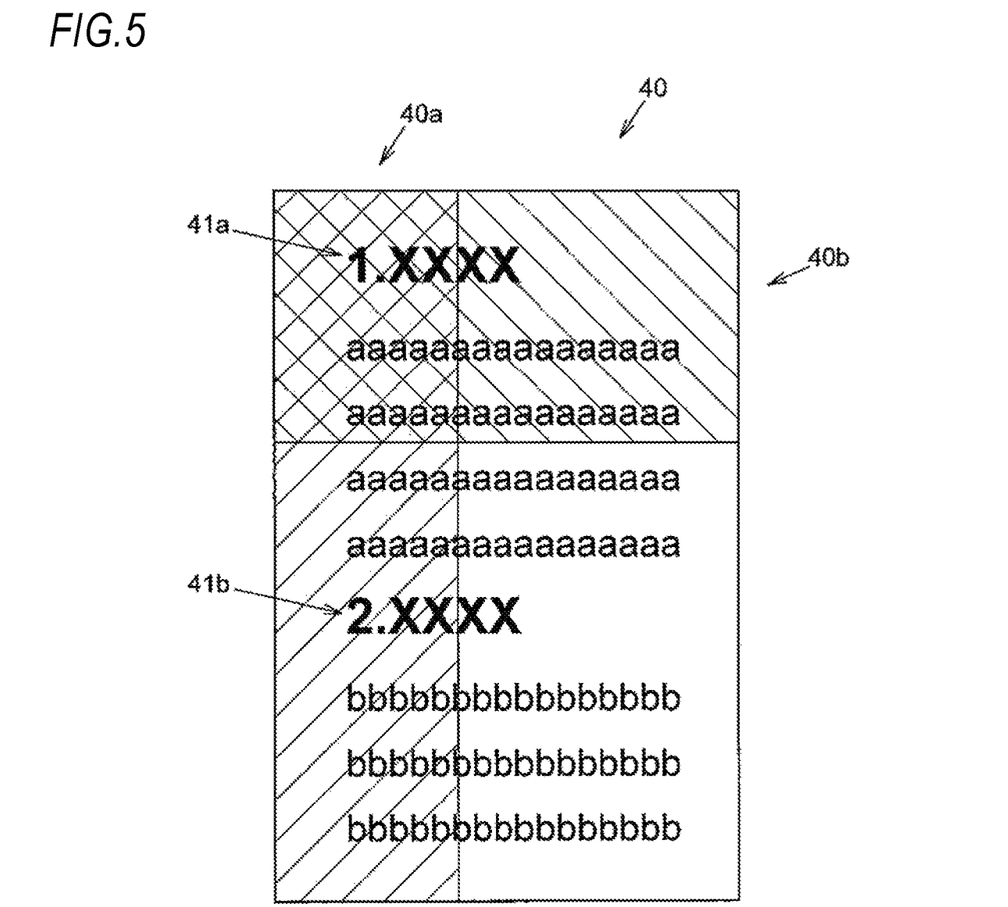
FIG. 5 is an explanatory view illustrating an example of search of a heading.

FIG. 5 is an explanatory view illustrating an example of search of a heading. As illustrated in FIG. 5, when a document file is written horizontally, since each row is written starting from the left end, a hatched area from the top to the bottom of a page on the left side of one page 40 is set as a search range 40*a*.

Then, when a search is made in the search range 40*a* and a character is found, the font size, thickness and position of the character are stored. Two candidates 41*a* and 41*b* that may be headings are illustrated in FIG. 5. However, when the candidate 41*a* is regarded as a heading according to a heading determination method to be described later, a portion of the page including the candidate 41*a* is set as a preview range 40*b*.

After the search in the search range is completed, the number of rows including a font with the maximum font size among the found fonts is counted (S14).

The font size determination unit 1032 compares the font sizes searched and stored by the font search unit 1031 in the search and determines a character with the maximum font size in the search range. Then, the row number determination unit 1034 counts the number of rows each including the character of the maximum font size.

Next, the row number determination unit 1034 determines the counted number of rows each including the character of the maximum font size (S15), and a process of determining a heading based on the determined number of rows is divided as follows.

Figure 6A:
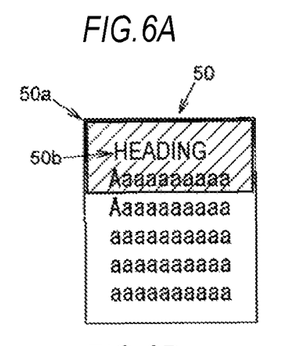
FIGS. 6A to 6E are explanatory views illustrating examples of a pattern of heading determination, illustrating patterns 1 to 5, respectively.

FIGS. 6A to 6E illustrate examples of a pattern of heading determination. FIG. 6A illustrates a pattern 1 where a heading 50*b* is present at the top of a page 50 and a predetermined portion including the heading 50*b* is set as a preview image 50*a*.

Figure 6B:
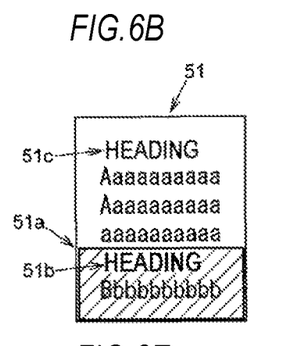

FIG. 6B illustrates a pattern 2 where plural heading candidates 51*b* and 51*c* are present in a page 51 and a predetermined portion including one heading candidate 51*b* is set as a preview image 51*a*.

Figure 6C:
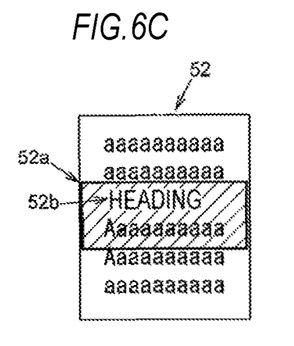

FIG. 6C illustrates a pattern 3 where a heading 52*b* is present in the middle of a page 52 and a predetermined portion including the heading 52*b* is set as a preview image 52*a*.

Figure 6D:
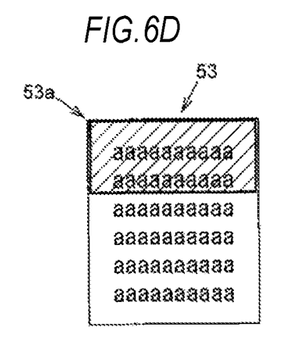

FIG. 6D illustrates a pattern 4 where, when a page 53 includes characters but the font sizes of all the characters are the same, there exists no particular heading and the upper end portion of the page is set as a preview image 53*a*.

Figure 6E:
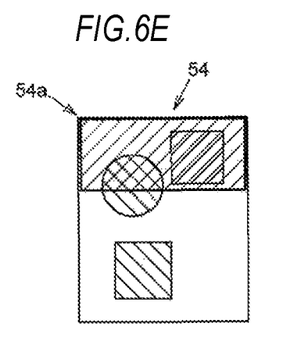

FIG. 6E illustrates a pattern 5 where a page 54 does not contain any characters but are composed of only image data and the upper end portion of the page 54 is set as a preview image 54*a*.

When it is determined in step S15 that the number of rows each including the character with the maximum font size is 0, the top portion of the page is displayed as a preview image (S16).

That is, the case where the number of rows each including the character of the maximum font size is 0 means that the page does not include any characters, as in the pattern 5 in FIG. 6E. In this case, the preview image generating processor 101 creates a predetermined portion from the top of the page as a preview image, as indicated by reference numeral 54*a* in FIG. 6E. The created preview image is displayed on the display 121 by the preview data management unit 102.

Next, when it is determined in step S15 that the number of rows each including the character of the maximum font size is 1, a portion including the row with the character of the maximum font size is displayed as a preview image (S17). That is, the preview image generating processor 101 generates a preview image with a portion of the row including the character with the largest font size, that is, a distinguishable part, as a heading.

That is, the case where the number of rows each including the character of the maximum font size is 1 means that a row including the character corresponds to a heading, as in the pattern 1 in FIG. 6A or the pattern 3 in FIG. 6C. Therefore, the preview image generating processor 101 creates, as a preview image, a predetermined portion from a row considered to be a heading. The created preview image is displayed on the display 121 by the preview data management unit 102.

When it is determined in step S15 that the number of rows each including the character of the maximum font size is 2 or more, a heading may not be determined only with the maximum font size and, therefore, the number of rows each including a character having the largest font thickness is counted (S18).

The case where the number of rows each including the character of the maximum font size is 2 or more includes a case where there are plural portions 51*b* and 51*c* having the maximum font sizes among plural characters having different font sizes, as in FIG. 6B, and a case where all the font sizes are same and maximum, as in the pattern 4 in FIG. 6D.

The font size determination unit 1032 compares the thicknesses of fonts searched and stored by the font search unit 1031 and determines a row including a character of the maximum font thickness. The row number determination unit 1034 counts the number of rows.

Then, the row number determination unit 1034 determines the number of rows each including the character of the maximum font thickness (S19).

When it is determined in step S19 that the number of rows each including the character of the maximum font thickness is (the number of rows is 1 in S19), a row including the character of the maximum font thickness is set as a heading and a predetermined portion including the heading is displayed as a preview image (S20). That is, when there are plural row portions each of which includes the character having the largest font size as a distinguishable part, the preview image generating processor 101 sets a portion of the row including the character with the largest font thickness among the plural row portions, as a heading, and generates a preview image with the heading.

For example, as in the pattern 2 in FIG. 6B, when the portions 51b and 51c have the maximum font sizes, the font thicknesses thereof are compared. The portion 51b having a thicker font is determined as a heading, and a portion including the heading 51b is set as a preview image 51a.

When it is determined in step S19 that the number of rows each including the character of the maximum font thickness is 2 or more (the number of rows is 2 or more in S19), that is, when there are plural portions each including both the maximum font size and the maximum font thickness, a row including a character of the maximum font thickness found first is determined as a heading and a predetermined portion including the heading is displayed as a preview image (S21).

For example, the case where the font size and the font thickness are all the same, as illustrated in FIG. 6D, is also included in the case where the number of rows each including the character of the maximum font thickness is 2 or more. At this time, a preview image 53a at the top of the page, which corresponds to a row including the character of the maximum font thickness found first, is displayed.

Next, it is determined whether or not processing has been completed for all the pages (S22). When it is determined that the processing has not been completed for all the pages (No in S22), the process returns to step S13 in which the processing for the next page is performed. On the other hand, when it is determined that the processing has been completed for all the pages (Yes in S22), the process is ended.

In this way, in the present exemplary embodiment, when the number of pages is equal to or larger than a predetermined number, a heading is searched and a portion of a page including the heading is created and displayed as a preview image.

MODIFIED EXAMPLES

In the aforementioned exemplary embodiment, the heading search is performed with attention paid to the character size and thickness. That is, first, a portion having the largest font size is searched. Then, when there is one portion having the largest font size in one page, the one portion is set as a heading. When there are plural portions having the largest font sizes, the font thicknesses are compared. When the font sizes are the same, a portion having a thicker font is set as a heading. Furthermore, when plural portions each having both the maximum font size and the maximum font thickness are found, a portion found first in the corresponding page is set as a heading. In a case of image data, when no character is found, the top of the corresponding page is displayed as a preview image.

However, a method of searching for a heading is not limited thereto. For example, as a modified example, instead of comparing and selecting the font sizes and the font thicknesses, it may be also possible to search for a portion in which characters are highlighted by a character color, bold, italic, underline or the like, as a heading. In this case, when there are plural portions each having both the maximum font size and the maximum font thickness as distinguishable parts, the preview image generating processor 101 sets a portion of a row including a character highlighted with respect to other portions as a heading and generates a preview image with the heading.

For example, the highlighting determination unit 1033 of the heading detecting unit 103 searches for a portion in which characters are highlighted by a character color, bold, italic, underline or the like. Then, the portion in which the characters are highlighted is set as a heading. At this time, when there are plural portions with highlighted characters, a portion found first is set as a heading.

In addition, a heading may be searched by determination using a combination of the font size, the font thickness and the character highlighting as well as only one of the font size, the font thickness and the character highlighting.

In addition, it may be also possible to allow a user to change the heading searching method. For example, the user may be allowed to search for a heading by prioritizing the font thickness over the font size.

In addition, a method of displaying a preview image of a heading is not limited to displaying a preview image of only a heading as illustrated in FIG. 3B. For example, merely by seeing the preview image 30 and the preview image 31 in FIG. 3B, a portion on each page where a heading is located may not be found.

Therefore, a preview image may be displayed so that the position of the heading in the page may be found. That is, when there exist a heading for generating a preview image and a portion other than the heading before, after, or before and after several rows following the heading, the preview image generating processor 101 adds the existing portion other than the heading, as a background image for indicating a position of the heading in one page before, after, or before and after the preview image according to a position where the portion exists.

Figure 7A:
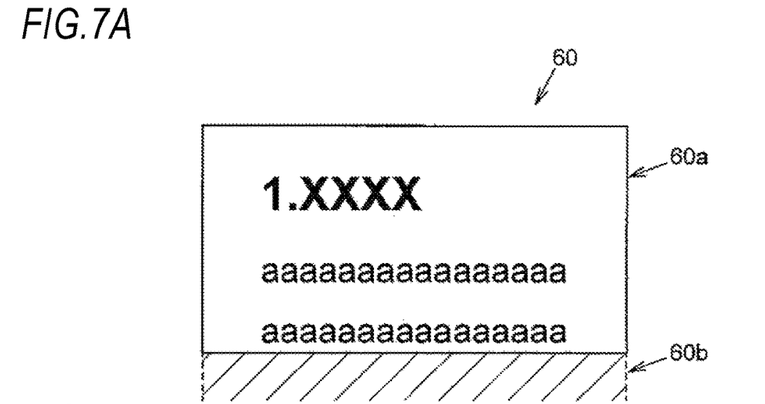
FIGS. 7A to 7C illustrate display examples of a preview image to be displayed so that a position of a heading in a page may be found, FIG. 7A illustrating a case where the heading is located in the upper end of the page, FIG. 7B illustrating a case where the heading is located in the lower end of the page, and FIG. 7C illustrating a case where the heading is located in the middle of the page.
Figure 7B:
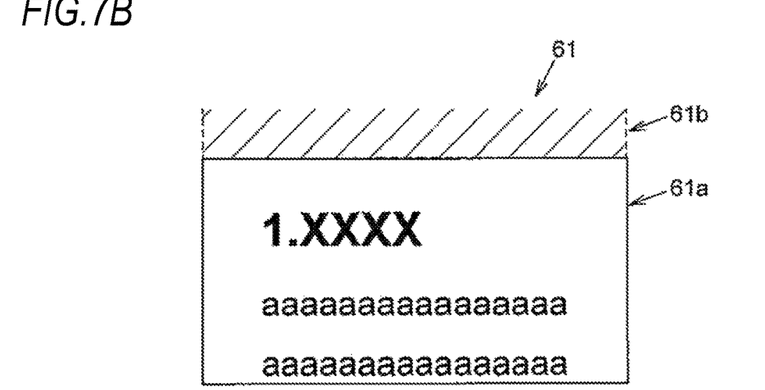
Figure 7C:
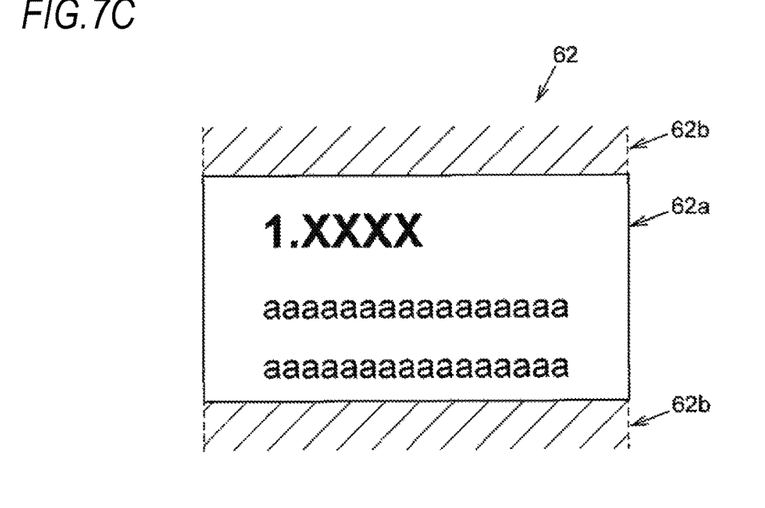

FIGS. 7A to 7C illustrate display examples of a preview image to be displayed so that a position of a heading in a page may be found, FIG. 7A illustrating a case where the heading is located in the upper end of the page, FIG. 7B illustrating a case where the heading is located in the lower end of the page, and FIG. 7C illustrating a case where the heading is located in the middle of the page.

A preview image 60 of the heading in FIG. 7A is a display example in the case of pattern 1 in FIG. 6A. That is, in the preview image 60, a portion other than the heading is added as a background image 60b below the heading 60a. As a result, in the case of FIG. 7A, it may be seen that the heading 60a exists in the upper end of the page.

A preview image 61 of the heading in FIG. 7B is a display example in the case of pattern 2 in FIG. 6B. That is, in the preview image 61, a portion other than the heading is added as a background image 61b above the heading 61a. As a result, in the case of FIG. 7B, it may be seen that the heading 61a exists in the lower end of the page.

A preview image 62 of the heading in FIG. 7C is a display example in the case of pattern 3 in FIG. 6C. That is, in the preview image 62, portions other than the heading are added as background images 62b and 62b above and below the heading 62a, respectively. As a result, in the case of FIG. 7C, it may be seen that the heading 62a exists in substantially the middle of the page.

In this manner, by displaying a preview image so that the position of a heading in a page may be found, it is easy to select a page desired by a user.

In the aforementioned exemplary embodiment, descriptions have been made on the assumption that a document file is horizontally written. However, the present invention may be equally applied to a case where the document file is vertically written.

In the case of vertical writing, typically, characters are written from the top to the bottom of rows and each of the rows is lined up from the right to the left. Therefore, in the case of vertical writing, a range for heading search is set to a horizontally long range from the right end to the left end on the upper end side of a page.

Then, within the range from the right end to the left end, a heading may be searched in the same manner as in the aforementioned exemplary embodiment. A method of determining a heading and a method of displaying a preview image are the same as those in the aforementioned exemplary embodiment.

Although various exemplary embodiments of the present invention have been described above, the present invention is not limited to these exemplary embodiments but various modifications may be made without departing from the spirit and scope of the present invention. For example, in the above exemplary embodiments, the image forming program is stored in the memory 11 of the image forming apparatus 1, but the image forming program may be provided while stored in a computer-readable recording medium such as a CD-ROM or the like.

In addition, some or all of components configuring the controller 10 may include a hardware circuit such as a reconfigurable circuit (e.g., a field programmable gate array (FPGA)), or an application specific integrated circuit (ASIC).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a memory that stores document data representing a page of a document; and
a processor functioning as a reduced image generation unit that
extracts, from horizontally-written document data stored in the memory in rows, a distinguishable row of characters having a feature that distinguishes at least one of the characters of the row from characters in other rows, as a heading, a search for the distinguishable row occurring during the extraction being performed in a range of rows extending vertically downward from a top of the page to a bottom of the page and including the left end of the page,
extracts, from vertically-written document data stored in the memory in rows, a distinguishable row of characters having a feature that distinguishes at least one of the characters in the row from other rows, as a heading, a search for the distinguishable row occurring during the extraction being performed in a range of rows extending horizontally leftward from a right end to a left end of the page and including the upper end of the page, and
generates a portion of the page including the heading as a reduced image of the page.

2. The image processing apparatus according to claim 1, wherein
the distinguishable feature is a largest font size of the characters in the document data, and
the reduced image generation unit generates as the heading of the reduced image, a portion of the distinguishable row that includes a character having the largest font size.

3. The image processing apparatus according to claim 2, wherein when a plurality of portions of rows include the character having the largest font size as the distinguishable feature, the reduced image generation unit generates as the heading of the reduced image, a portion of a row that includes a character having a largest font thickness among the plurality of portions.

4. The image processing apparatus according to claim 3, wherein when each of a plurality of portions of rows has both the largest font size and the largest font thickness as the distinguishable feature, the reduced image generation unit generates as the heading of the reduced image, a portion of a row that includes a character highlighted with respect to other portions of rows having both the largest font size and the largest font thickness among the plurality of portions of rows.

5. The image processing apparatus according to claim 1, wherein when the heading for generating the reduced image and a portion other than the heading above, below, or above and below at least two rows following the heading exist, the reduced image generation unit adds the existing portion other than the heading, as a background image for increasing the noticeability of the heading on the page above, below, or above and below the heading according to a position where the portion exists.

6. The image processing apparatus according to claim 2, wherein when the heading for generating the reduced image and a portion other than the heading above, below, or above and below at least two rows following the heading exist, the reduced image generation unit adds the existing portion other than the heading, as a background image for increasing the noticeability of the heading on the page above, below, or above and below the heading according to a position where the portion exists.

7. The image processing apparatus according to claim 3, wherein when the heading for generating the reduced image and a portion other than the heading above, below, or above and below at least two rows following the heading exist, the reduced image generation unit adds the existing portion other than the heading, as a background image for increasing the noticeability of the heading on the page above, below, or above and below the heading according to a position where the portion exists.

8. The image processing apparatus according to claim 4, wherein when the heading for generating the reduced image and a portion other than the heading above, below, or above and below at least two rows following the heading exist, the reduced image generation unit adds the existing portion other than the heading, as a background image for increasing the noticeability of the heading on the page above, below, or above and below the heading according to a position where the portion exists.

9. An image processing method comprising:
extracting, with a processor from horizontally-written document data representing a page of a document stored in a memory in rows, a distinguishable row of characters having a feature that distinguishes at least one of the characters in the row from other rows, as a heading, by searching for the distinguishable row during the extracting in a range of rows extending vertically downward from a top of the page to a bottom of the page and including the left end of the page, extracting, with the processor from vertically-written document data of a page stored in a memory in rows, a distinguishable row of characters having a feature that distinguishes at least one of the characters in the row from other rows, as a heading, by searching for the distinguishable row during the extracting in a range of rows extending horizontally leftward from a right end of the page to a left end of the page and including an upper end of the page; and generating, with the processor, a portion of the page including the heading as a reduced image of the page.

10. A non-transitory computer readable medium storing an image processing program that causes a computer, having a memory storing document data representing a page of a document, to function as:

a reduced image generation unit that
extracts, from horizontally-written document data stored in the memory in rows, a distinguishable row of characters having a feature that distinguishes at least one of the characters of the row from characters in other rows, as a heading, a search for the distinguishable row occurring during the extraction being performed in a range of rows extending vertically downward from a top of the page to a bottom of the page and including the left end of the page, extracts, from vertically-written document data stored in the memory in rows, a distinguishable row of characters having a feature that distinguishes at least one of the characters in the row from other rows, as a heading, a search for the distinguishable row occurring during the extraction being performed in a range of rows extending horizontally leftward from a right end to a left end of the page and including the upper end of the page, and generates a portion of the page including the heading as a reduced image of the page.

\* \* \* \* \*